(12) United States Patent
Kelly et al.

(10) Patent No.: US 7,484,060 B2
(45) Date of Patent: Jan. 27, 2009

(54) SYSTEMS AND METHODS FOR PROTECTING CUSTOMER SECRETS DURING VENDOR TROUBLESHOOTING

(75) Inventors: Tom Kelly, Fergus (CA); Ron Frederick, Mountain View, CA (US); Bert Bonkowski, Waterloo (CA)

(73) Assignee: Blue Coat Systems, Inc., Sunnyvale, CA (US)

( * ) Notice: Subject to any disclaimer, the term of this patent is extended or adjusted under 35 U.S.C. 154(b) by 196 days.

(21) Appl. No.: 11/380,624

(22) Filed: Apr. 27, 2006

(65) Prior Publication Data

US 2007/0255912 A1 Nov. 1, 2007

(51) Int. Cl.
*G06F 12/00* (2006.01)
(52) U.S. Cl. .................... 711/163; 711/161; 711/112; 714/100
(58) Field of Classification Search .................. 711/163
See application file for complete search history.

(56) References Cited

U.S. PATENT DOCUMENTS

| 5,058,164 | A * | 10/1991 | Elmer et al. ................. 713/190 |
|---|---|---|---|
| 5,754,647 | A * | 5/1998 | Hsu ............................ 711/163 |
| 5,809,542 | A * | 9/1998 | Tsuboi et al. ................ 711/162 |
| 5,860,115 | A * | 1/1999 | Neuhard et al. .............. 711/147 |
| 6,795,963 | B1 * | 9/2004 | Andersen et al. ............. 717/130 |
| 2003/0217277 | A1 * | 11/2003 | Narayanan ................... 713/187 |
| 2004/0162642 | A1 * | 8/2004 | Gasper et al. ................ 700/286 |
| 2004/0205304 | A1 * | 10/2004 | KcKenney et al. ........... 711/148 |
| 2005/0050401 | A1 * | 3/2005 | Matsuki et al. ............... 714/42 |
| 2005/0204107 | A1 * | 9/2005 | Narayan et al. .............. 711/162 |

* cited by examiner

*Primary Examiner*—Matt Kim
*Assistant Examiner*—Ryan Dare
(74) *Attorney, Agent, or Firm*—Sonnenschein Nath & Rosenthal LLP

(57) ABSTRACT

Systems, methods, and computer products for protecting information during troubleshooting are provided. A dumping mechanism includes marking at least one of a plurality of memory regions in the computer-readable medium as non-dumpable, initiating a core dump, determining which memory regions of the plurality regions are non-dumpable, and dumping the contents only of memory regions not marked as non-dumpable.

31 Claims, 5 Drawing Sheets

SYSTEMS AND METHODS FOR PROTECTING CUSTOMER SECRETS DURING VENDOR TROUBLESHOOTING

FIELD OF THE INVENTION

This invention relates generally to protecting customer secret data during troubleshooting, and more particularly to methods and systems for marking memory regions as non-dumpable so that those regions will not become part of a core dump.

BACKGROUND

A proxy can become privy to information that is intended to be secret. Some of these secrets are private to the organization that owns the proxy, e.g., the passwords the proxy uses to access servers, while others are the secrets of the users whose traffic traverses the proxy. Becoming privy to user's secrets is particularly likely when the proxy is capable of intercepting and decrypting encrypted traffic, such as HTTPS traffic. The proxy should attempt to prevent the disclosure of these secrets.

Conventional commercial IT products often include a troubleshooting mechanism that makes a complete copy of the contents of the device's memory at the time a fault is detected (a so-called memory or "core" dump). The information in this dump is typically sent to the vendor of the device and used by the vendor's engineering team to analyze the state of the device at the time of the fault in an attempt to find the root cause.

The conventional dump mechanism is indiscriminate in that it dumps all the contents of the device's memory. If the device's memory contains secret or sensitive data, this data will be exposed to the vendor's engineering team if and when the dump is sent for analysis. This exposure is a problem for both the customer and the vendor. The customer has exposed secret data (either his own or his users) and so must consider them compromised. Users will have their privacy invaded. Furthermore, possession of this secret data may impose a duty on the vendor to keep that data secret. If the data is revealed by the vendor's action, embarrassment or possibly legal liability could result. In certain jurisdictions, evidence of criminal activity discovered in such a way may have to be reported to the authorities. Thus, the employee may be placed in the difficult position of violating confidentiality agreements or the law.

SUMMARY OF THE INVENTION

The invention reduces the risk of disclosing secret information during troubleshooting by eliminating secret information from the dump. Systems, methods, and computer products consistent with embodiments of the present invention provide a mechanism for marking areas of memory that contain secret or sensitive information as non-dumpable. The dumping mechanism then consults these marks to determine whether or not to include the area of memory within the dump.

Systems, methods, and computer products consistent with embodiments of the present invention are directed to protecting information during troubleshooting. An embodiment of a method consistent with the present invention includes marking at least one of a plurality of memory regions in a memory as non-dumpable; initiating a core dump; determining which memory regions of the plurality of memory regions are non-dumpable; and dumping the contents only of memory regions not marked as non-dumpable. Marking at least one memory region may include calling a marking method of a kernel application program interface (API). Marking at least one memory region may also include marking the memory region as non-dumpable when the memory region is allocated. Marking at least one memory region may further include marking memory regions associated with a transaction as non-dumpable when the memory regions are allocated. Moreover, marking at least one memory region may include marking an object as non-dumpable and marking all memory used by the object as non-dumpable.

In one embodiment consistent with the invention, the data processing system is a proxy. Marking may include marking at least one memory region that stores data associated with network traffic through the proxy. The data associated with network traffic may be decrypted data of an HTTPS transfer. Furthermore, initiating a core dump may be performed in response to detecting a fault. In one embodiment consistent with the present invention, the method further includes encrypting data stored in at least one memory region marked as non-dumpable; and dumping the encrypted data.

An embodiment of a computer program product consistent with the present invention includes a computer-readable medium having stored thereon computer-readable instructions for marking at least one of a plurality of memory regions in a memory as non-dumpable; initiating a core dump; determining which memory regions of the plurality of memory regions are non-dumpable; and dumping the contents only of memory regions not marked as non-dumpable. Marking at least one memory region may include calling a marking method of a kernel application program interface (API). Marking at least one memory region may also include marking the memory region as non-dumpable when the memory region is allocated. Marking at least one memory region may further include marking memory regions associated with a transaction as non-dumpable when the memory regions are allocated. Moreover, marking at least one memory region may include marking an object as non-dumpable and marking all memory used by the object as non-dumpable.

In one embodiment consistent with the invention, the data processing system is a proxy. Marking may include marking at least one memory region that stores data associated with network traffic through the proxy. The data associated with network traffic may be decrypted data of an HTTPS transfer. Furthermore, initiating a core dump may be performed in response to detecting a fault. In one embodiment consistent with the present invention, the computer program product further includes instructions for encrypting data stored in at least one memory region marked as non-dumpable; and dumping the encrypted data.

An embodiment of a system consistent with the present invention includes a data processing system for protecting information during troubleshooting having a memory having stored thereon a computer program for marking at least one of a plurality of memory regions in the computer-readable medium as non-dumpable, initiating a core dump, determining which memory regions of the plurality regions are non-dumpable, and dumping the contents only of memory regions not marked as non-dumpable; and a processor for executing the computer program.

Other systems, methods, features, and advantages of the invention will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION OF THE INVENTION

Reference will now be made in detail to an implementation consistent with the present invention as illustrated in the accompanying drawings. Wherever possible, the same reference numbers will be used throughout the drawings and the following description to refer to the same or like parts.

Figure 1:
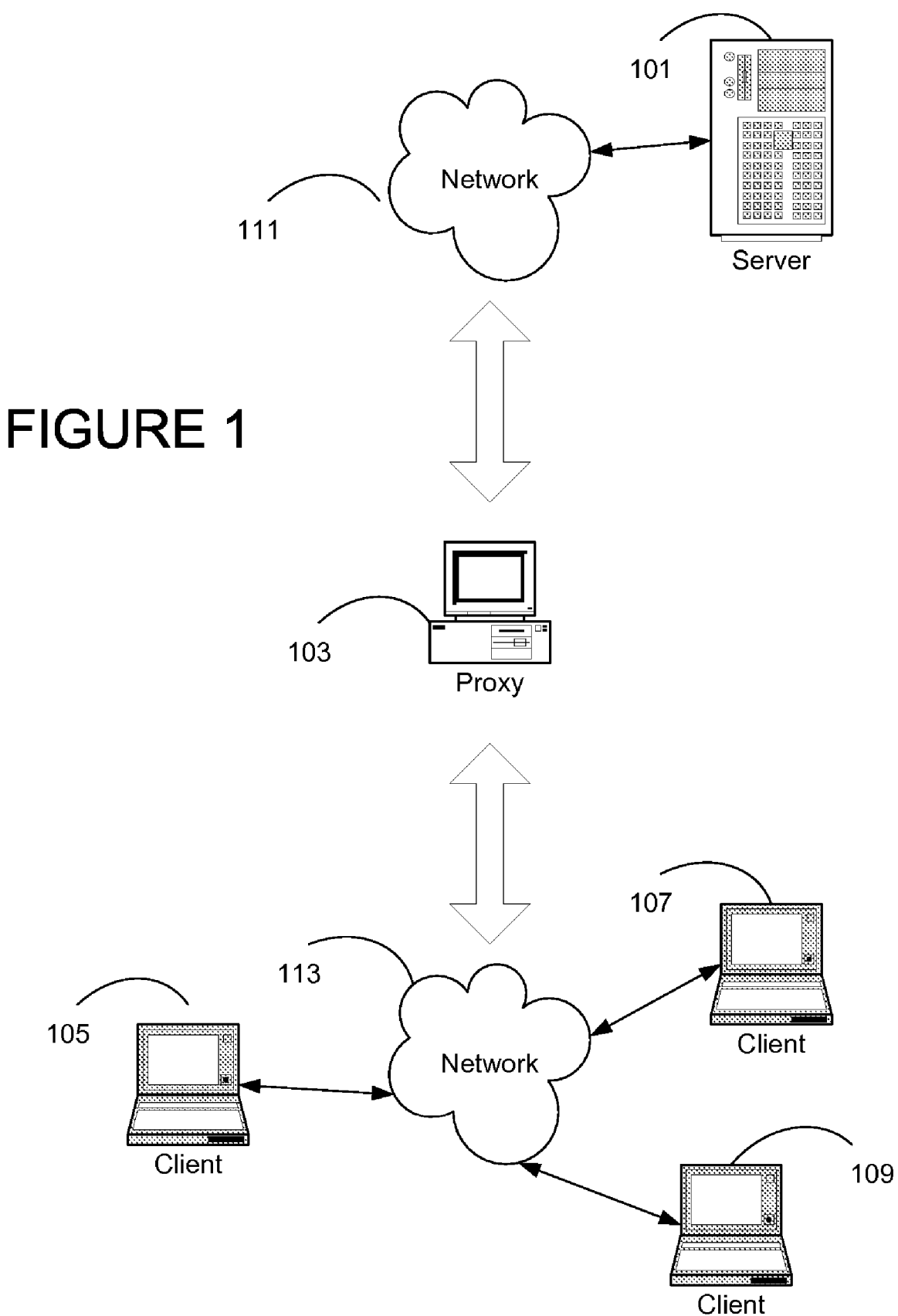
FIG. 1 illustrates an exemplary network environment.

FIG. 1 illustrates a communication system in embodiments consistent with the present invention operate. Proxy 103 is connected to client computers 105, 107, and 109 via a first network 113, e.g., an intranet. Proxy 103 intercepts communication between client computers 105, 107, and 109, and a second network 111, e.g., the Internet. Thus, if server 101 attempts communication with any of client computers 105, 107, and 109, that communication must go through proxy 103. Likewise, if any of client computers 105, 107, and 109 attempts communication outside of first network 113, that communication must also go through proxy 103. In one embodiment of the invention, proxy 103 is a Secure Sockets Layer Hypertext Transfer Protocol (HTTPS) proxy. As an HTTPS proxy, proxy 103 can originate secure requests to the origin content server. Data transmitted between the client and proxy 103 is encrypted and decrypted using public and private keys established on the proxy 103 and the client. If the proxy 103 is initiating secure requests to an origin content server, that traffic is also encrypted.

Figure 2:
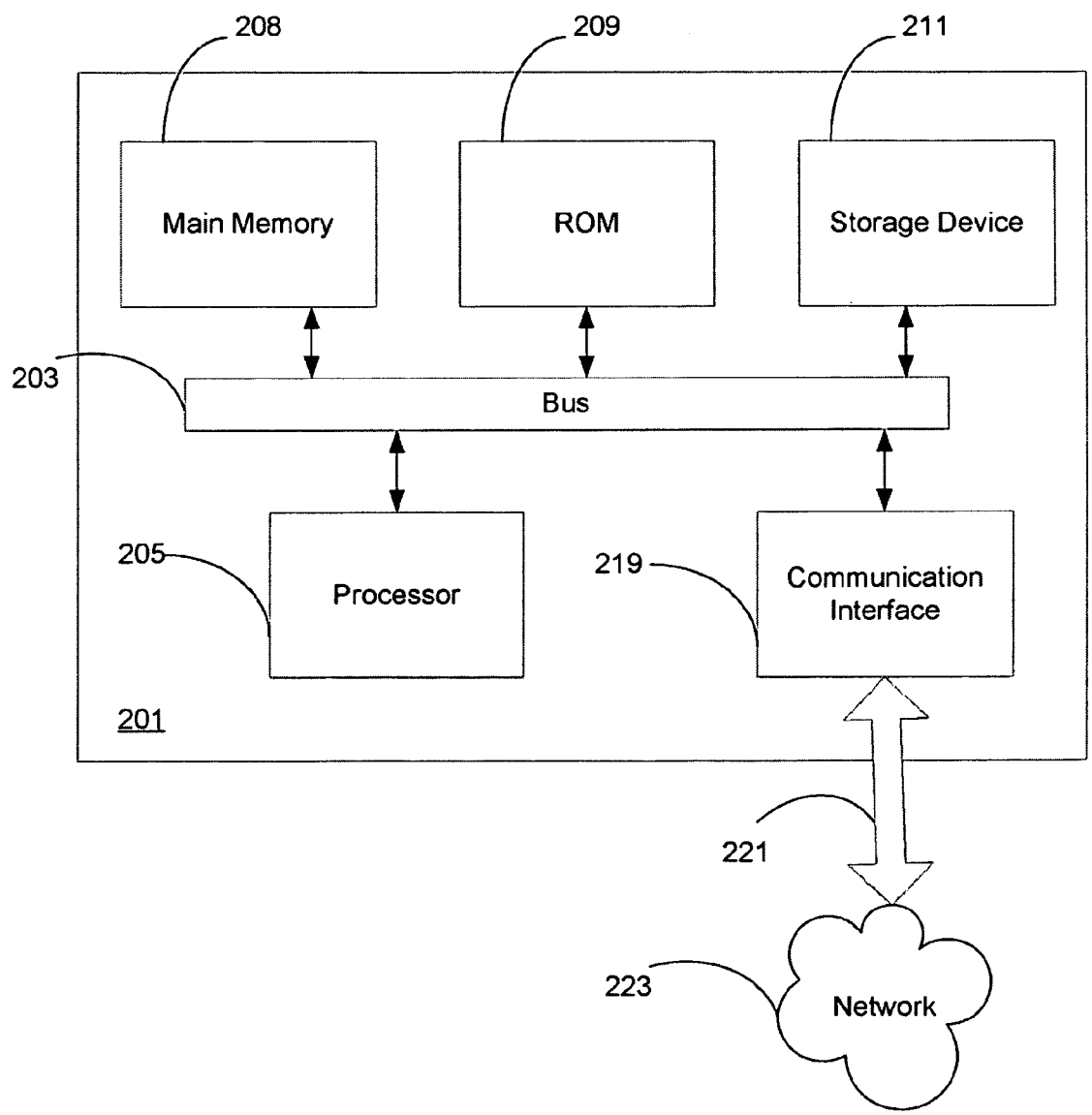
FIG. 2 illustrates a exemplary computer system.

FIG. 2 is a diagram of a data processing system that can be configured as a proxy consistent with an embodiment of the present invention. Computer system 201 includes a bus 203 or other communication mechanism for communicating information, and a processor 205 coupled with bus 203 for processing the information. Computer system 201 also includes a main memory 208, such as a random access memory (RAM) or other dynamic storage device, coupled to bus 203 for storing information and instructions to be executed by processor 205. In addition, main memory 208 may be used for storing temporary variables or other intermediate information during execution of instructions to be executed by processor 205. Computer system 201 further includes a read only memory (ROM) 209 or other static storage device coupled to bus 203 for storing static information and instructions for processor 205. A storage device 211, such as a magnetic disk or optical disk, is provided and coupled to bus 203 for storing information and instructions.

According to one embodiment, processor 205 executes one or more sequences of one or more instructions contained in main memory 208. Such instructions may be read into main memory 208 from another computer-readable medium, such as storage device 211. Execution of the sequences of instructions contained in main memory 208 causes processor 205 to perform the process steps described herein. One or more processors in a multi-processing arrangement may also be employed to execute the sequences of instructions contained in main memory 208. In alternative embodiments, hard-wired circuitry may be used in place of or in combination with software instructions. Thus, embodiments are not limited to any specific combination of hardware circuitry and software.

Further, the instructions to support the system interfaces and protocols of system 201 may reside on a computer-readable medium. The term "computer-readable medium" as used herein refers to any medium that participates in providing instructions to processor 205 for execution. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Computer system 201 also includes a communication interface 219 coupled to bus 203. Communication interface 219 provides a two-way data communication coupling to a network link 221 that is connected to a local network 223. For example, communication interface 219 may be a network interface card. As another example, communication interface 219 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 219 sends and receives electrical, electromagnetic or optical signals that carry digital data streams representing various types of information.

Figure 3:
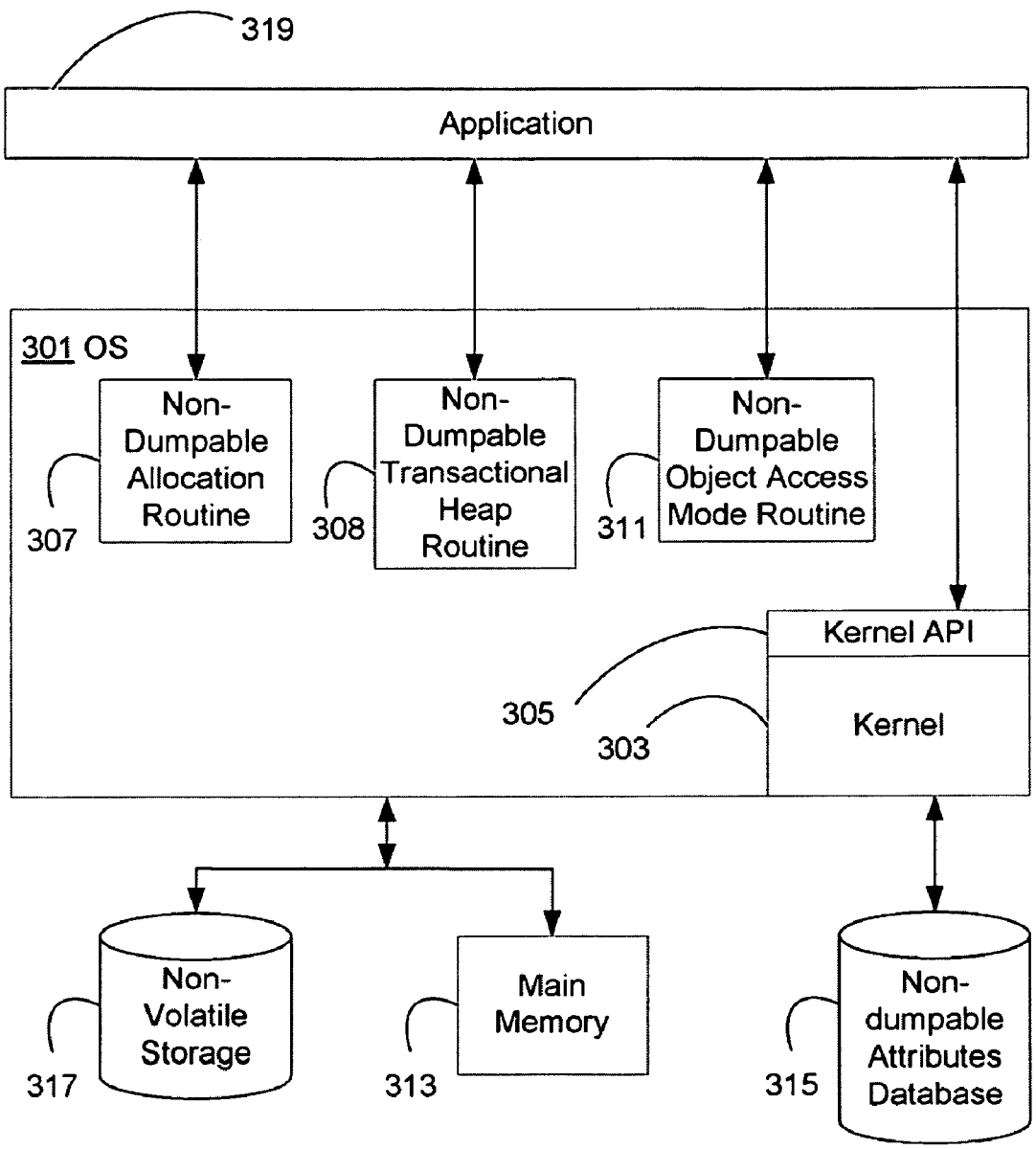
FIG. 3 illustrates a functional block diagram of an embodiment consistent with the present invention.

FIG. 3 illustrates functional block diagram of one embodiment consistent with the present invention, which may be implemented on computer system 201. In one embodiment consistent with the present invention, the computer system 201 is a proxy appliance. An Operating System (OS) 301 includes a kernel 303 and a kernel API 305 with which to make calls to the kernel. The kernel API includes a method call for marking a region in memory as non-dumpable. In one embodiment consistent with the invention, the memory is a four kilobyte memory page. The OS may include a non-dumpable allocation routine 307 that, when called, allocates memory to the calling application and marks the allocated memory regions as non-dumpable. The OS may further include a non-dumpable transactional heap routine 308 that, when called, allocates a memory heap for a transaction and marks memory regions of the allocated heap as non-dumpable. The OS may further include a non-dumpable object access mode routine 311 that marks the memory regions associated with or used by an object as non-dumpable if the object has been indicated as secret.

In one embodiment consistent with the present invention, an Application 319 may make a call to any of the non-dumpable allocation routine 307, non-dumpable transactional heap routine 308, and non-dumpable object access mode routine 311 to mark a memory region as non-dumpable. In another embodiment consistent with the present invention, the Application 319 may directly call a method in the kernel API 305, which causes the kernel 303 to mark the indicated memory region as non-dumpable. A non-dumpable attribute database 315 is maintained to indicate which memory regions in memory 313 are marked as non-dumpable. Alternatively, non-dumpable attributes may be maintained in main memory. Persistent storage 317 may be used to store the dumped memory region data of memory 313.

Consistent with one embodiment of the present invention, a heap is used for storing secrets, (e.g. passwords the proxy knows). When this heap acquires memory from the underlying system, it directs the kernel to mark the pages that comprise the memory as non-dumpable. This ensures that any secrets stored in memory allocated from this heap are never dumped. If the heap returns memory to the system to make it available for other use, it ensures that it is cleared (set to zero).

In another embodiment consistent with the invention, the proxy uses a specific kind of heap for allocating memory that is needed only during processing of that transaction which has different performance characteristics than other heaps. A transaction may be a request/response passed through a proxy, as well as all of the decisions and associated processing performed by the proxy in handling the request/response. When the proxy starts a transaction that may include processing of secret data, it creates a variant transaction heap that uses the kernel API to mark the memory it acquires as non-dumpable.

In yet another embodiment consistent with the invention, a proxy transaction that processes secret data may decide to cache that data on the disk so that it can be delivered more quickly if requested again. The data are cached in an object, i.e., a unit of persistent storage referring to a resource identified by a URL. If the object contains secret data, the object is marked on the disk as being secret. When the cache subsystem loads the data from the disk into memory (so that it can be delivered to a client or for any other reason), it marks the memory areas into which the object data is read as non-dumpable.

An object storage system provides for the creation of and subsequent access to or deletion of objects (or files) stored on computer-readable media, and an API. An object may be a cached copy of content obtained from a remote server or a file. The object storage API includes a method call to identify an object's contents to be temporarily stored only in memory regions that are marked as non-dumpable. That is, as the object is being created, all of the data to be contained in the object may only be temporarily stored (on its way to computer-readable media) in non-dumpable memory regions. The object is itself marked as non-dumpable when it is created. Conversely, when data from an object marked as non-dumpable is transferred into a memory region for temporary storage before being transported elsewhere in a secure manner, the memory region involved must also be marked non-dumpable. That is, the need for non-dumpable memory to be used in storing secret data to computer-readable media is not only imposed by applications that understand the need to avoid exposing such data during storage. It is also imposed by means of an attribute stored with the object or file so that subsequent use by any unaware application correctly results in the use of non-dumpable memory when the object data is read from computer-readable media.

Figure 4:
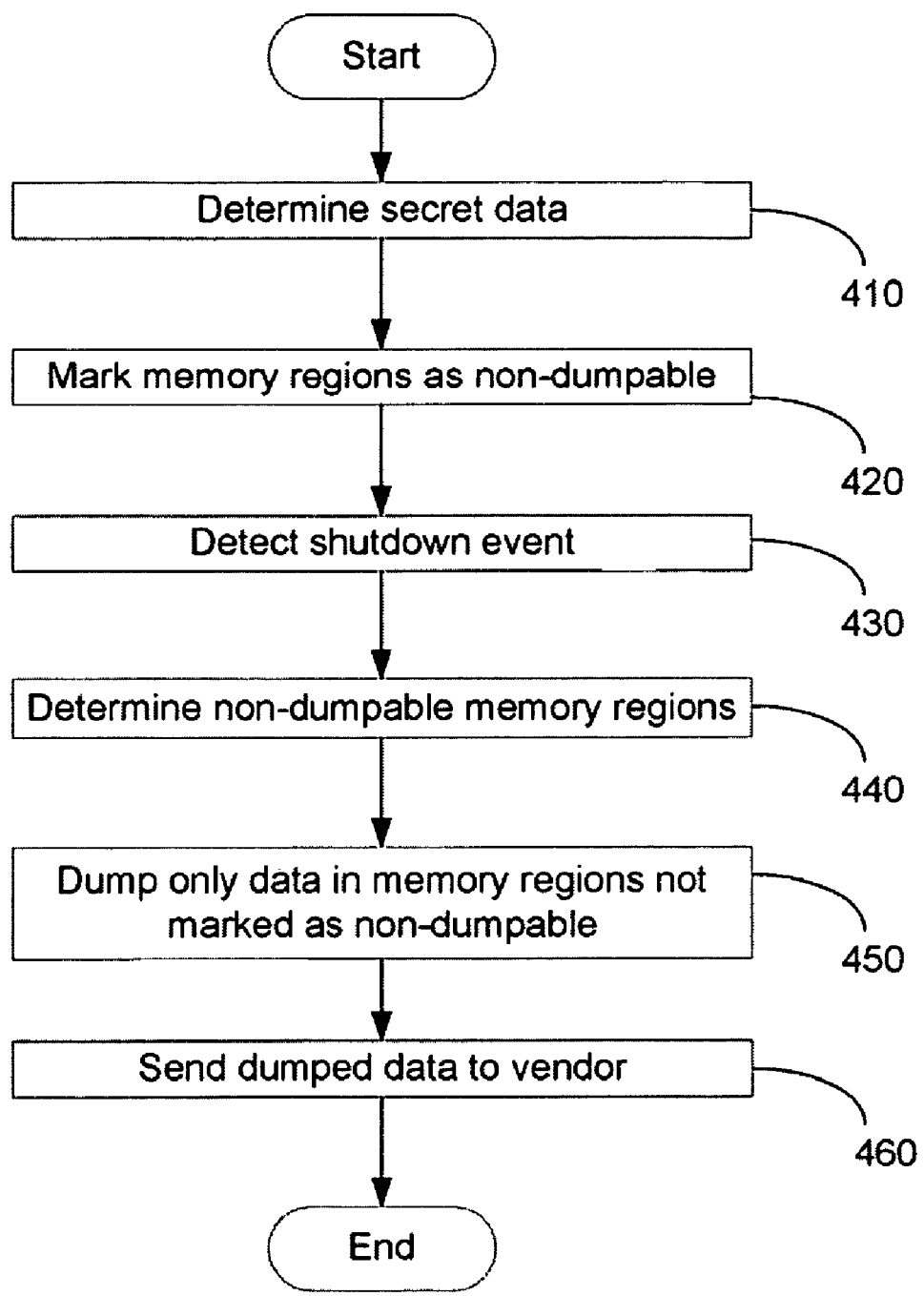
FIG. 4 illustrates a flow diagram depicting a method consistent with one embodiment of the present invention for preventing disclosure of sensitive data to a vendor after a memory dump.

FIG. 4 illustrates a flow diagram depicting a method consistent with one embodiment of the present invention for preventing disclosure of sensitive data to a vendor after a memory dump. At step 410, an application determines that data is secret or sensitive, and thus should be stored in a memory region marked as non-dumpable. The data may be a password or decrypted HTTPS traffic. The application makes a call to the OS to mark the memory regions storing this data as non-dumpable as step 420. In one embodiment consistent with the present invention, the application calls one of a non-dumpable allocation routine, a non-dumpable transactional heap routine, and a non-dumpable object access mode routine in the OS to mark a memory region as non-dumpable. In another embodiment consistent with the present invention, the application directly calls a method in a kernel API, which causes the kernel of the OS to mark the indicated memory region as non-dumpable. At step 430, a shutdown event is detected, e.g., a fault, that initiates a memory dump. The OS determines which memory regions are non-dumpable by examining the non-dumpable attribute database at step 440. At step 450, the OS causes the data in the memory regions that are not marked as non-dumpable to a non-volatile storage medium. The dumped data is then transmitted to a vendor for troubleshooting at step 460.

Figure 5:
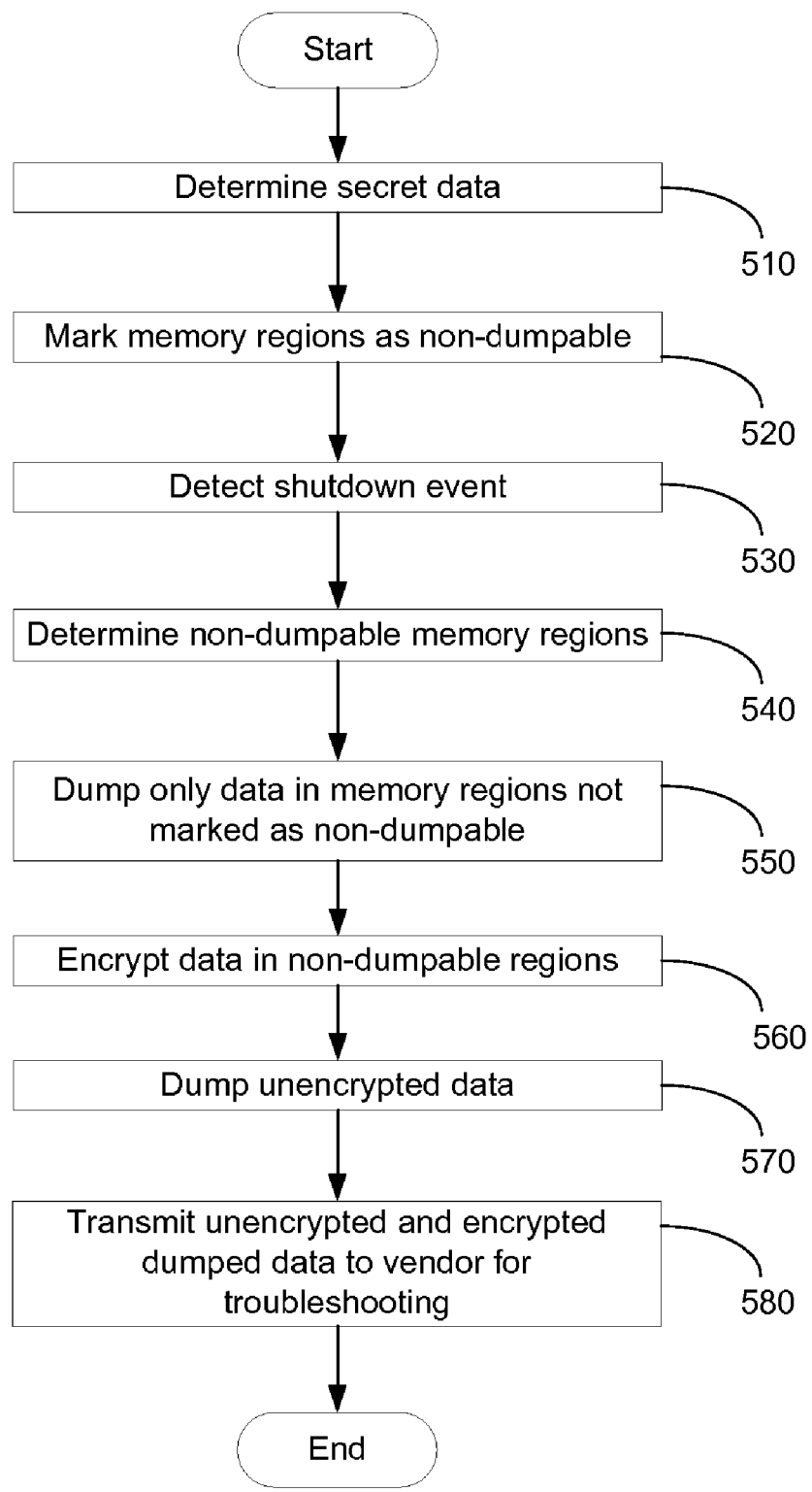
FIG. 5 illustrates a flow diagram depicting a method consistent with another embodiment of the present invention for preventing disclosure of sensitive data to a vendor after a memory dump.

FIG. 5 illustrates a flow diagram depicting another method consistent with one embodiment of the present invention for preventing disclosure of sensitive data to a vendor after a memory dump. At step 510, an application determines that data is secret or sensitive, and thus should be stored in a memory region marked as non-dumpable. The application makes a call to the OS to mark the memory regions storing this data as non-dumpable as step 520. In one embodiment consistent with the present invention, the application calls one of a non-dumpable allocation routine, a non-dumpable transactional heap routine, and a non-dumpable object access mode routine in the OS to mark a memory region as non-dumpable. In another embodiment consistent with the present invention, the application directly calls a method in a kernel API, which causes the kernel of the OS to mark the indicated memory region as non-dumpable.

At step 530, a shutdown event is detected, initiating a memory core dump. The OS determines which memory regions are non-dumpable by examining the non-dumpable attribute database at step 540. At step 550, the OS causes the data in the memory regions that are not marked as non-dumpable to a non-volatile storage medium. At step 560, the OS encrypts the data in the memory regions that are marked as non-dumpable. The encrypted data is then dumped to the non-volatile storage medium at step 570. Both unencrypted and encrypted dumped data are then transmitted to a vendor for troubleshooting at step 580. If the encrypted data is required for troubleshooting, the OS administrator may provide the vendor with the encryption key to decrypt the data.

While there has been illustrated and described what is at present considered to be the preferred embodiment of the present invention, it will be understood by those skilled in the art that various changes and modifications may be made and equivalents may be substituted for elements thereof without departing from the true scope of the invention. Therefore, it is intended that this invention not be limited to the particular embodiment disclosed, but that the invention will include all embodiments falling within the scope of the appended claims.

We claim:

1. A method for protecting information in a data processing system, the data processing system having a memory and a disk, the method comprising:

marking a first memory region in the memory as non-dumpable;

for an object containing first data, the first data stored on the disk, if the first data is secret, marking the object as non-dumpable; otherwise, not marking the object as non-dumpable;

if the object is marked as non-dumpable, transferring the first data from the disk to the first memory region; otherwise, transferring the first data from the disk to a second memory region not marked as non-dumpable;

locating, when a data processing system fault is detected, the second memory region; and dumping data from the second memory region for troubleshooting.

2. The method of claim 1, further comprising:

for second data with unknown secrecy status, determining whether the second data is secret or not secret; and if the second data is determined to be secret, storing the second data in the first memory region, otherwise storing the second data in the second memory region.

3. The method of claim 1, further comprising:
for second data with unknown secrecy status, the second data stored in the memory, determining whether the second data is secret or not secret; and
if the second data is determined to be secret, marking regions in the memory storing the second data as non-dumpable.

4. The method of claim 1, further comprising encrypting data from the first memory region and dumping said encrypted data.

5. The method of claim 1, wherein marking the object as non-dumpable comprises storing an attribute with the object.

6. The method of claim 1, wherein marking the first memory region as non-dumpable comprises maintaining a non-dumpable attribute database so as to maintain a record of which memory regions in the memory are marked as non-dumpable.

7. The method of claim 6, wherein locating the second memory region comprises examining the non-dumpable attribute database.

8. The method of claim 1, wherein marking the first memory region as non-dumpable comprises calling a marking method of a kernel application program interface (API).

9. The method of claim 1, wherein marking the first memory region as non-dumpable comprises marking the first memory region as non-dumpable when the first memory region is allocated to a calling application.

10. The method of claim 1, wherein transferring the first data from the disk to the first or second memory regions comprises loading data from a cache into the memory.

11. The method of claim 1, wherein the first data is secret if the first data comprises a password known by a proxy or decrypted HTTPS traffic.

12. The method of claim 1, wherein the first data comprises data cached by a proxy.

13. The method of claim 1, wherein the first data comprises data associated with network traffic through a proxy.

14. The method of claim 1, wherein the data processing system fault is a shutdown event.

15. The method of claim 1, wherein the object comprises a cached copy of content obtained from a remote server.

16. A computer-readable medium having stored thereon computer-readable instructions for executing a method for protecting information in a data processing system, the data processing system having a memory and a disk, the method comprising:
marking a first memory region in the memory as non-dumpable;
for an object containing first data, the first data stored on the disk, if the first data is secret, marking the object as non-dumpable; otherwise, not marking the object as non-dumpable;
if the object is marked as non-dumpable, transferring the first data from the disk to the first memory region; otherwise, transferring the first data from the disk to a second memory region not marked as non-dumpable;
locating, when a data processing system fault is detected, the second memory region; and
dumping data from the second memory region for troubleshooting.

17. The computer-readable medium of claim 16, further comprising:
for second data with unknown secrecy status, determining whether the second data is secret or not secret; and
if the second data is determined to be secret, storing the second data in the first memory region, otherwise storing the second data in the second memory region.

18. The computer-readable medium of claim 16, further comprising:
for second data with unknown secrecy status, the second data stored in the memory, determining whether the second data is secret or not secret; and
if the second data is determined to be secret, marking regions in the memory storing the second data as non-dumpable.

19. The computer-readable medium of claim 16, further comprising encrypting data from the first memory region and dumping said encrypted data.

20. The computer-readable medium of claim 16, wherein marking the object as non-dumpable comprises storing an attribute with the object.

21. The computer-readable medium of claim 16, wherein marking the first memory region as non-dumpable comprises maintaining a non-dumpable attribute database so as to maintain a record of which memory regions in the memory are marked as non-dumpable.

22. The computer-readable medium of claim 21, wherein locating the second memory region comprises examining the non-dumpable attribute database.

23. The computer-readable medium of claim 16, wherein marking the first memory region as non-dumpable comprises calling a marking method of a kernel application program interface (API).

24. The computer-readable medium of claim 16, wherein marking the first memory region as non-dumpable comprises marking the first memory region as non-dumpable when the first memory region is allocated to a calling application.

25. The computer-readable medium of claim 16, wherein transferring the first data from the disk to the first or second memory regions comprises loading data from a cache into the memory.

26. The computer-readable medium of claim 16, wherein the first data is secret if the first data comprises a password known by a proxy or decrypted HTTPS traffic.

27. The computer-readable medium of claim 16, wherein the first data comprises data cached by a proxy.

28. The computer-readable medium of claim 16, wherein the first data comprises data associated with network traffic through a proxy.

29. The computer-readable medium of claim 16, wherein the data processing system fault is a shutdown event.

30. The computer-readable medium of claim 16, wherein the object comprises a cached copy of content obtained from a remote server.

31. A data processing system for protecting information, the system comprising:
a memory;
a disk;
a computer-readable medium having stored thereon a computer program for marking a first memory region in the memory as non-dumpable; for an object containing first data, the first data stored on the disk, if the first data is secret, marking the object as non-dumpable; otherwise, not marking the object as non-dumpable; if the object is marked as non-dumpable, transferring the first data from the disk to the first memory region; otherwise, transferring the first data from the disk to a second memory region not marked as non-dumpable; locating, when a data processing system fault is detected, the second memory region; and dumping data from the second memory region for troubleshooting; and
a processor for executing the computer program.

* * * * *